(12) United States Patent
Matsunaga et al.

(10) Patent No.: US 9,098,775 B2
(45) Date of Patent: Aug. 4, 2015

(54) MULTI-CLASS IDENTIFIER, METHOD, AND COMPUTER-READABLE RECORDING MEDIUM

(71) Applicant: CASIO COMPUTER CO., LTD., Shibuya-ku, Tokyo (JP)

(72) Inventors: Kazuhisa Matsunaga, Fussa (JP); Masayuki Hirohama, Fussa (JP); Kouichi Nakagome, Tokorozawa (JP); Michihiro Nihei, Mitaka (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 143 days.

(21) Appl. No.: 13/904,911

(22) Filed: May 29, 2013

(65) Prior Publication Data

US 2013/0322743 A1 Dec. 5, 2013

(30) Foreign Application Priority Data

May 31, 2012 (JP) ................................. 2012-125408

(51) Int. Cl.
G06K 9/62 (2006.01)
(52) U.S. Cl.
CPC ............ *G06K 9/6227* (2013.01); *G06K 9/6256* (2013.01); *G06K 9/6281* (2013.01)
(58) Field of Classification Search
None
See application file for complete search history.

(56) References Cited

U.S. PATENT DOCUMENTS

| 6,915,011 | B2 | 7/2005 | Loui et al. | |
|---|---|---|---|---|
| 7,450,759 | B2 | 11/2008 | Kudoh | |
| 2005/0111737 | A1* | 5/2005 | Das et al. | 382/190 |
| 2010/0260255 | A1* | 10/2010 | Sannidhi et al. | 375/240.02 |

FOREIGN PATENT DOCUMENTS

| JP | 2002-203242 A | 7/2002 |
|---|---|---|
| JP | 2003-016448 A | 1/2003 |
| JP | 2005-267607 A | 9/2005 |
| JP | 2007-026098 A | 2/2007 |
| JP | 2011-035636 A | 2/2011 |

OTHER PUBLICATIONS

Jamie Shotton, TextonBoost: Joint Appearance, Shape and Context Modeling for Multi-Class Object Recognition and Segmentation, 2006, ECCV 2006, Part I, LNCS 3951, pp. 1-15.*

* cited by examiner

*Primary Examiner* — Jayesh A Patel
*Assistant Examiner* — Mai Tran
(74) *Attorney, Agent, or Firm* — Holtz, Holtz, Goodman & Chick PC

(57) ABSTRACT

A multi-class identifier identifies a kind of an imager, and identifies in detail with respect to a specified kind of a group. The multi-class identifier includes: an identification fault counter providing the image for test that includes any of class labels to the kind identifiers so that the kind identifiers individually identify the kind of the provided image, and counting, for a combination of arbitrary number of kinds among the plurality of kinds, the number of times of incorrect determination in the arbitrary number of kinds that belongs to the combination; a grouping processor, for a group of the combination for which count result is equal to or greater than a predetermined threshold, adding a group label corresponding to the group to the image for learning that includes the class label corresponding to any of the arbitrary number of kinds that belongs to the group.

9 Claims, 13 Drawing Sheets

FIG.4

|  | COMMON DANDELION | KANTO DANDELION | SUNFLOWER | TULIP | BINDWEED | FALSE BINDWEED |
|---|---|---|---|---|---|---|
| COMMON DANDELION | 15 | 15 | 5 | 5 | 5 | 5 |
| KANTO DANDELION | 15 | 15 | 5 | 5 | 5 | 5 |
| SUNFLOWER |  |  | 50 |  |  |  |
| TULIP |  |  |  | 50 |  |  |
| BINDWEED | 5 | 5 |  |  | 20 | 20 |
| FALSE BINDWEED | 5 | 5 |  |  | 20 | 20 |

MULTI-CLASS IDENTIFIER, METHOD, AND COMPUTER-READABLE RECORDING MEDIUM

CROSS-REFERENCE TO RELATED APPLICATION

This application claims the benefit of Japanese Patent Application No. 2012-125408, filed on May 31, 2012, the entire disclosure of which is incorporated by reference herein.

FIELD

This application relates generally to a multi-class identifier, a method, and a computer-readable recording medium.

BACKGROUND

Sometimes, people would like to know a name of a flower seen at hills and fields or roadside. Hence, a technique is proposed in which many partial features of subject flowers and leaves are extracted from digital images of the flowers and leaves obtained with a digital camera or the like using a clustering method, and the information in which the extracted characteristic group is expressed in histogram-like manner is used as characteristic quantities. In this technique, one or more characteristic quantities are calculated, and the calculated characteristic quantities and characteristic quantities of various plants pre-registered in a database are analyzed by using a statistical method to identify kind of a wild plant (refer to Unexamined Japanese Patent Application Kokai Publication No. 2002-203242, for example).

A technique is known in which an image including a major photographic subject such as a flower is divided into a region of flower which is the major photographic subject and a region of background image by the Graph Cuts method (refer to Unexamined Japanese Patent Application Kokai Publication No. 2011-035636, for example).

When performing an image classification on an input image, such as an image of a flower, according to a machine learning, it is possible to easily realize an identifier with two classes which performs image classification with two patterns that the image is an image per se of some kind or others. On the other hand, when performing an image classification with multi classes, which identifies several kinds of images among a plurality of kinds of images, an identifier with multi classes are generally constituted by combining the identifiers of two classes. For example, when images of flowers are classified into six kinds, six identifiers with two classes are generated. Each identifier is generated so as to output the greatest identification score value when an image of a kind assigned to each identifier is input. Then, when an image is input into each identifier, a kind corresponding to the identifier which outputs the highest identification score value is used as an identification result. As related art literature of the clustering method, there are Unexamined Japanese Patent Application Kokai Publication No. 2003-016448, Unexamined Japanese Patent Application Kokai Publication No. 2007-026098, and Unexamined Japanese Patent Application Kokai Publication No. 2005-267607, for example.

A technique described in Unexamined Japanese Patent Application Kokai Publication No. 2003-016448 has an object to provide a system for segmenting images into coarse regions such as foreground and background, and deriving a measure of the total similarity from the similarity between the foreground and background regions. An event clustering method according to this technique uses foreground and background segmentation for clustering images from a group into similar events. Initially, each image is divided into a plurality of blocks, thereby providing block-based images. Utilizing a block-by-block comparison, each block-based image is segmented into a plurality of regions including at least a foreground and a background. One or more luminosity, color, position, or size features are extracted from the regions and the extracted features are utilized to estimate and compare the similarity of the regions including the foreground and background in successive images in the group. Then, a measure of the total similarity between successive images is computed, thereby providing image distance between successive images, and event clusters are delimited from the image distance.

A technique described in Unexamined Japanese Patent Application Kokai Publication No. 2007-026098 discloses an additional information determination method of additional information concerning a recognition technique which determines a category to which each pattern belongs from a plurality of categories, based on the pattern recognition result of a pattern and the additional information associated with each pattern. The additional information determination method makes a computer execute the following processes: a process of acquiring a confusion matrix having each element constituted of each probability of being decided as belonging to each category including a true category when each pattern has been pattern recognized; a process for receiving target recognition performance; a code definition process for determining code definition so as to satisfy the target performance being input corresponding to the code of the additional information to be added to the pattern concerned for the true category of each pattern, by referring to the confusion matrix; and a process for outputting the code definition as additional information.

A technique described in Unexamined Japanese Patent Application Kokai Publication No. 2005-267607 provides a digital picture book system which searches descriptions of photographic subjects imaged by imaging means and provides the description to a user, and includes: imaging means which picks up an image; major photographic subject selecting means to select major photographic subjects from the image; feature extracting means to extract features of major photographic subjects; image database selecting means to select an image database which stores features of extracted kinds from a plurality of image databases which store descriptions of the photographic subjects associating with the plurality of mutually different kinds of features in the photographic subjects; and description searching means to search descriptions of the major photographic subjects from the selected image database.

For example, when constituting an identifier with multi classes for a classification of kinds of flowers, if an image includes an image of a kind of flower per se and an image of another flower which is very similar to the flower, a machine learning device is hard to identify. On the other hand, when the images of the flowers are the same kind but learned data thereof is slightly different from each other, there is a problem that an overfitting occurs in the conventional machine learning, and that these images are not identifiable.

FIG. 13 illustrates an example of overfitting. This drawing represents an identification border 1303 to identify a Kanto dandelion (Taraxacum platycarpum Dahlst; hereinafter, referred to as Kanto dandelion) and a common dandelion (Taraxacum officinale; hereinafter, referred to as common dandelion), and for the sake of simplification of description, illustrates that identification is performed on a two-dimensional characteristic information space formed by characteristic information 1 and characteristic information 2.

Originally, a Kanto dandelion and a common dandelion are close resemblance kinds, and it is difficult to identify the kinds only from shapes or directions of the overall flowers, and it is possible to identify the kinds when detail part of the calyx of the flower is observed. Under such situation, it is supposed that data for learning including two or more kinds is used, a positive data group 1301 which is correct answer data, and a negative data group 1302 which is incorrect answer data is classified, and a machine learning is caused to be performed.

In this case, with conventional machine learning device, priority is given only to classifying the positive data group 1301 and the negative data group 1302, and consequently, there are many cases where a machine learning device forcibly search for the difference with paying attention to difference in the images which is not essential as for a classification of the kinds of the flowers.

For example, if a flower just happened to face to the right illustrated as 1305 in the positive data group 1301 of the learning image, and a flower just happened to face to the left illustrated as 1306 in the negative data group 1302, a part 1304 of an identification border 1303 regarding the characteristic information 1 and the characteristic information 2 which is set in an identifier, is set on the basis of the direction of the flower such as facing to the right or facing to the left.

As a result, there is a problem that, in the boundary part 1304 on the identification border 1303, a Kanto dandelion and a common dandelion are no longer determined based on a correct identification criterion (difference of the calyx of flowers), and identification performance is decreased. The problem has not been solved by techniques described in related art literatures mentioned above.

SUMMARY

An object of the present invention is to avoid an overfitting in image identification with multi-class in which close resemblance kinds are included.

One aspect of the present invention provides a multi-class identifier identifying a kind of an image by a first class identifier, and identifying in detail with respect to a specified kind of a group including specified kinds by a second class identifier, the multi-class identifier including:

a first learner receiving the image for learning that includes a class label corresponding to any of a plurality of kinds, and generating kind identifiers based on the received image that individually identifies the kind of image;

an identification fault counter providing the image for test that includes any of class labels to the kind identifiers so that the kind identifiers individually identify the kind of the provided image, and counting, for a combination of arbitrary number of kinds among the plurality of kinds, the number of times of incorrect determination in the arbitrary number of kinds that belongs to the combination;

a grouping processor, for a group of the combination for which count result is equal to or greater than a predetermined threshold, adding a group label corresponding to the group to the image for learning that includes the class label corresponding to any of the arbitrary number of kinds that belongs to the group; and a second learner receiving the image for learning including the group label, generating group identifier based on the received image that identifies the group of image, forming the first class identifier by combining the group identifier and the kind identifier that identifies the kind being excluded from the group, and generating intra-group identifier that identifies the arbitrary number of kinds of images belonging to the group, to form the second class identifier.

According to the present invention, it is possible to avoid an overfitting in image identification with multi-class in which close resemblance kinds are included.

BRIEF DESCRIPTION OF THE DRAWINGS

A more complete understanding of this application can be obtained when the following detailed description is considered in conjunction with the following drawings, in which:

FIG. 4 is a drawing illustrating a configuration example of mixing-matrix data;

DETAILED DESCRIPTION

Hereinafter, with reference to drawings, an embodiment of the present invention will be described in detail.

Figure 1:
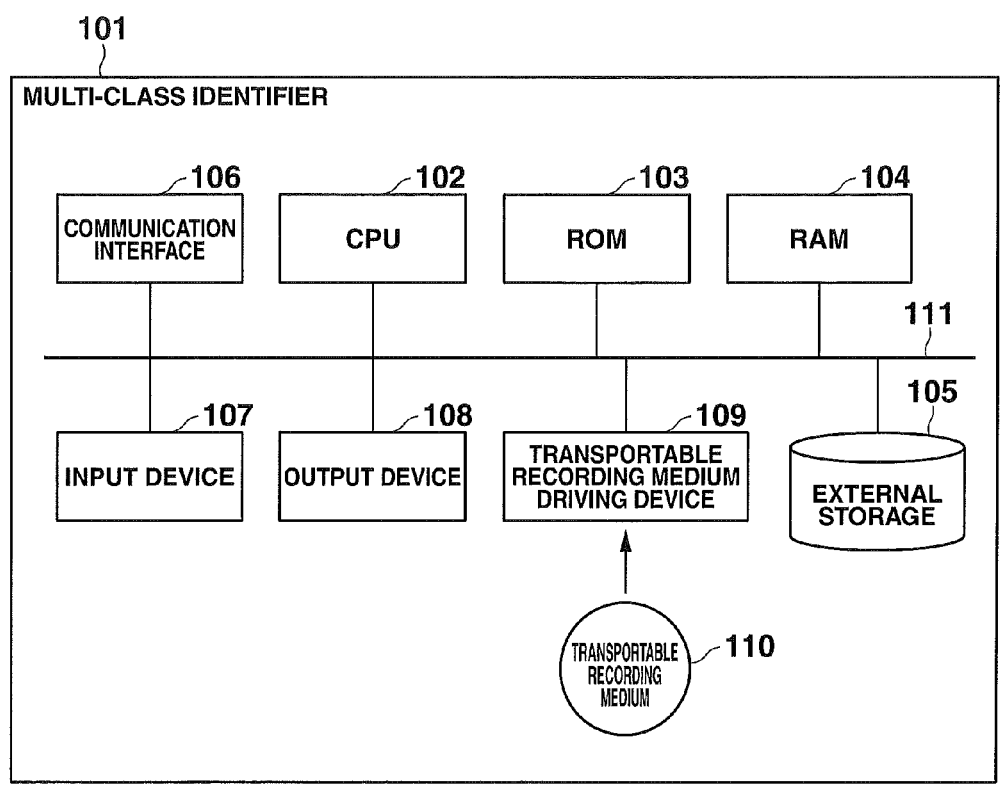
FIG. 1 is a block diagram illustrating a hardware configuration example of a multi-class identifier according to one embodiment of the present invention.

FIG. 1 is a block diagram illustrating a hardware configuration example of a multi-class identifier 101 according to one embodiment of the present invention.

The multi-class identifier 101 is realized on a computer in a search system which receives photographed image data of a flower for example, from a personal digital assistant such as so-called smartphone, retrieves and identifies the kind of the flower by an identifier, and returns the identification result to the personal digital assistant.

The multi-class identifier 101 includes a CPU (Central Processing Unit) 102, and a ROM (Read Only Memory) 103 and a RAM (Random Access Memory) 104. In addition, the multi-class identifier 101 includes an external storage 105 such as a hard disk storage device, a communication interface 106, an input device 107 such as a keyboard or a mouse, and an output device 108 such as a display device. Further, the multi-class identifier 101 includes a transportable recording medium driving device 109 on which transportable recording medium 110, such as an SD memory card, a USB (Universal Serial Bus) memory card, CD (Compact Disk) and DVD (Digital Versatile Disk) is capable of set. Respective components 102 to 109 are connected each other by a bus 111.

The ROM 103 stores a control program of a multi-class identifier generation process illustrated by flowcharts in FIG. 3, FIG. 6 and FIG. 8 to FIG. 12 and described below. From the ROM 103, the CPU 102 reads the control program and executes the control program using the RAM 104 as a work memory. By this means, the multi-class identifier generating function illustrated by the functional blocks in FIG. 2 which are described below is realized, and consequently, the multi-class identifier, which identifies the kinds of flowers for example, is generated. The multi-class identifier is realized by software in some cases, and is stored in the ROM 103, the RAM 104, or the external storage 105. Note that the data for learning and data for test which are input in the multi-class identifier generation process are supplied from the transportable recording medium 110 set on the transportable recording medium driving device 109, or the external storage 105, for example.

After the multi-class identifier is generated, the CPU 102 operates as the multi-class identifier by reading and executing software for the multi-class identifier stored in the ROM 103, the RAM 104, or the external storage 105. Alternatively, in some cases, the multi-class identifier is executed on another computer system. The multi-class identifier receives the photographed image data of a flower by the communication interface 106 through the Internet from the personal digital assistants such as so-called smartphone, for example. Then, the multi-class identifier retrieves and identifies the kind of the flower, and returns the identification result to the personal digital assistant through the Internet from the communication interface 106. Note that, in some cases, the smartphone is directly provided with an image identifier, for example as an installed application of a smartphone.

Figure 2:
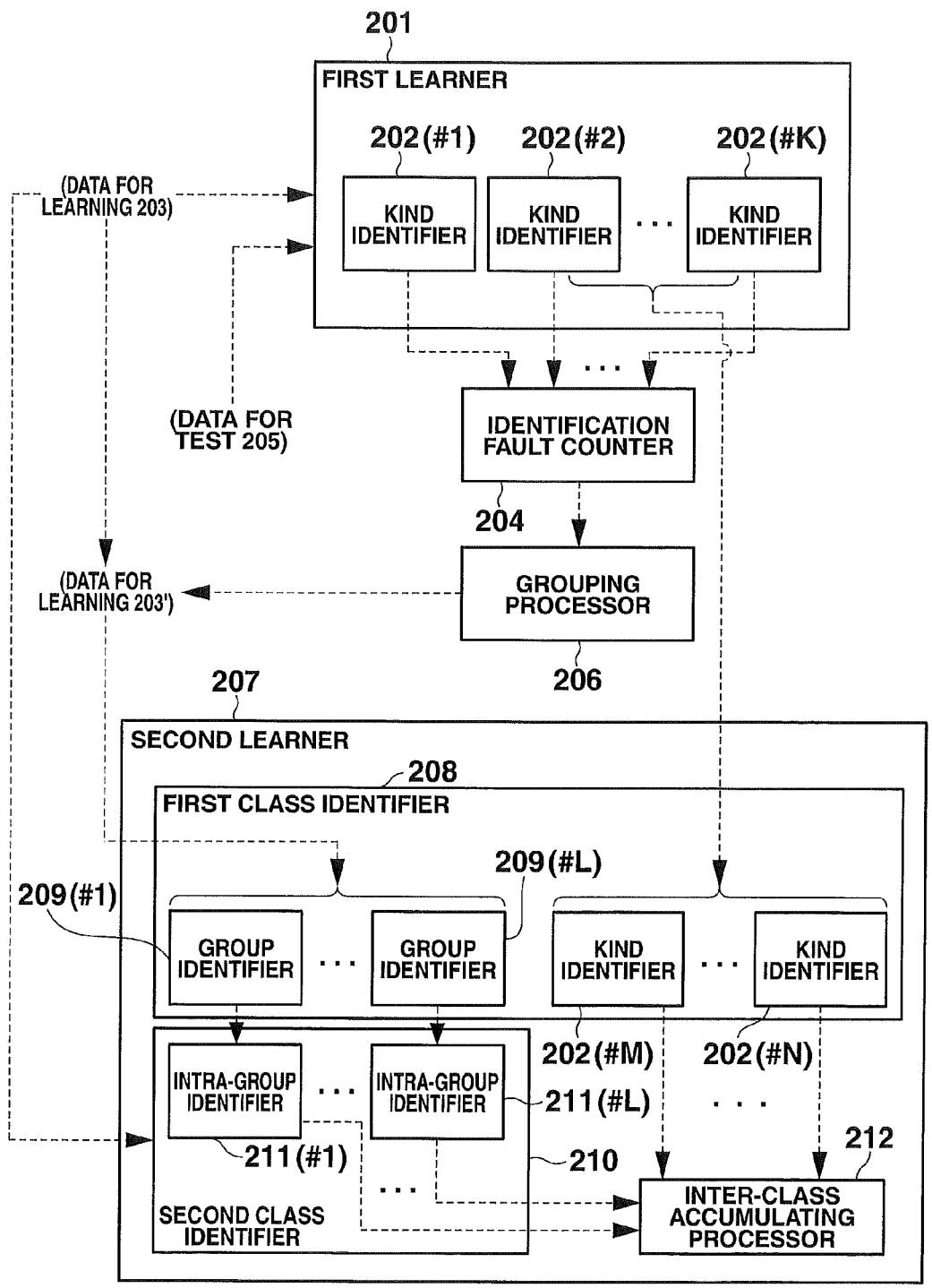
FIG. 2 is a functional block diagram illustrating a functional configuration of the multi-class identifier in FIG. 1.

FIG. 2 is a functional block diagram illustrating a functional configuration of the multi-class identifier 101 in FIG. 1.

The multi-class identifier 101 in the present embodiment is realized as multi-layer identifiers for the image which identifies the kind of images, such as an image of a flower, by a first class identifier 208, and further identifies the kind of image in groups of specified kinds in detail by the second class identifier 209.

The first learner 201 is input with data for learning 203, regarding a flower for example, which includes a class label corresponding to any of a plurality of kinds (for example, the number of kinds is represented by K), and generates kind identifiers 202 which identify individually the kind of the image of the data for learning 203. The data for learning 203 includes the image data and the class label corresponding to the kind of the image of the image data. According to the kinds of, for example, flowers to be identified, K pieces of the kind identifiers 202 are generated from #1 to #K. Each kind identifier 202 is realized, for example, as an identifier for two classes which classifies two patterns whether the input image data is a kind per se corresponding to the kind identifier 202 or a kind other than the kind. As for the data for learning 203, for example, if there are six kinds of flower to be identified, 50 sheets for every kind, that is, 50 sheets×six kinds=300 sheets, will be input and learned.

An identification fault counter 204 provides the data for test 205 including any of above-described class labels to the kind identifiers 202 of #1 to #K. The kind identifiers 202 of #1 to #K individually identify the kind of the image of the data 205. The data for test 205 includes the image data and the class label corresponding to the kind of the image of the image data. The identification fault counter 204 counts, for each combination of arbitrary number of kinds, such as combination of two kinds, among a plurality of kinds (K kinds), the number of times of mutual incorrect determination between the arbitrary number of kinds which belongs to the combination by the kind identifiers 202. For example, in an example of flowers, the number of times of incorrect identification between the common dandelion and the Kanto dandelion is mutually counted. Specifically, the total of the number of times that the kind identifier 202 for the Kanto dandelion has identified incorrectly the data for test 205 including the class label of the common dandelion as the Kanto dandelion, and the number of times that the kind identifier 202 for the common dandelion has identified incorrectly the data for test 205 including the class label of the Kanto dandelion as the common dandelion is counted. The data for test 205 is image data which is different from the data for learning 203, and as is the case with the data for learning 203, if there are six kinds of flowers to be identified for example, 50 sheets for each kind for example, that is, 50 sheets×six kinds=300 sheets, will be input and identified.

For each group of the combination for which the count result by the identification fault counter 204 is equal to or greater than a predetermined threshold (for example, 25 times or more, or 50% or more), a grouping processor 206 adds a group label corresponding to the group to the data for learning that includes the class label corresponding to any of a predetermined number of kinds which belongs to the group. The data for learning to which the group label is added in this manner is referred to as data 203'. In an example of flowers, if the number of times of mutual incorrect identification between the common dandelion and the Kanto dandelion is 30, and exceeds the threshold of 25 times, for example, a group label of a dandelion group is further added to the data for learning 203 that includes the class label of the common dandelion and the data for learning 203 includes the class label of the Kanto dandelion, to generate the data for learning 203'. In another example, if the number of times of incorrect identification between a bindweed and a false bindweed is 40, and exceeds the threshold of 25 times, for example, a group label of a bindweed group is further added to the data for learning 203 that includes the class label of the bindweed and the data for learning 203 that includes the class label of the false bindweed, to generate the data for learning 203'.

The second learner 207 is input with data for learning 203' that includes the above-described group label, and generates group identifiers 209 which identify the group of the image of the data 203'. According to the grouped kinds of flower to be identified, L-pieces of the group identifiers 209 are generated from #1 to #L. In the above-described example, since two groups of the dandelion group and the bindweed group are generated, L is 2 and two group identifiers 209 are generated. Each group identifier 209 is realized, for example, as an identifier for two classes which classifies images in two patterns whether the input data is the kind itself which belongs to the group corresponding to the group identifier 209 or a kind other than the kind. As for the data for learning 203', as is the case with the data for learning 203, if there are six kinds of flower to be identified, for example, 50 sheets for each kind, that is, 50 sheets×six kinds=300 sheets, will be input and learned. In the data for learning 203', data for learning 203' that includes the group label of the dandelion group includes the class label of the Kanto dandelion or the common dandelion. In addition, data for learning 203' that includes the group label of the bindweed group includes the class label of the bindweed or the false bindweed. The second learner 207 forms the first class identifier 208 by combining L-pieces of group identifiers 209 from #1 to #L generated in above-described manner and the kind identifiers 202 (hereinafter, these are numbered from #M to #N) which identify individually the kinds not belonging to each above-mentioned group.

Next, the second learner 207 is input with the data for learning 203 for each above-described group (for example, the dandelion group, and the bindweed group). Then, the second learner 207 generates L-pieces of intra-group identifiers 211 from #1 to #L, each of which identifies individually a predetermined number of kinds (for example, two kinds) of the images belonging to the group, and forms a second class identifier 210. In the example of flowers, with respect to the dandelion group, an intra-group identifier 211 (#1) which identifies individually two kinds of the Kanto dandelion and the common dandelion is generated. With respect to the bindweed group, an intra-group identifier 211 (#2) which identifies individually two kinds of the bindweed and the false bindweed is generated.

Furthermore, the second learner 207 is capable of generating an inter-class accumulating processor 212 as follows. The inter-class accumulating processor 212 performs, with respect to the image of each group, an identification judging according to an identification score value obtained by adding an identification score value of the first class identifier 208 corresponding to the group, and a value in which the identification score value of the second class identifier 210 is multiplied by a predetermined magnification. Moreover, the inter-class accumulating processor 212 performs, with respect to the image of a kind belonging to neither of above-described groups, an identification judging according to the identification score value of the first class identifier 208 corresponding to the kind.

According to the functional block configuration illustrated in FIG. 2 mentioned above, in the present embodiment, a two-class identifier, which includes the first class identifier 208 identifying for each group unit, and the second class identifier 210 identifying in the group is realized, in order to avoid the overfitting in the multi-class classification of the image in which close resemblance kinds are included. In this case, according to the present embodiment, when determining a group, the kind identifier 202 which performs identification by machine learning in a state where grouping is not performed, is generated in advance by the first learner 201. Next, an identification test is performed by the identification fault counter 204 using the kind identifiers 202, and the number of times of occurring of an identification fault between categories is counted. Then, the categories in which the machine learning tends to make a mistake are grouped by the grouping processor 206.

In this way, according to the present embodiment, it is possible to determine and classify close resemblance kinds automatically by the count of the identification fault performed in advance, and using the result, two-class identification of an identification between groups and an identification in a group is performed. Consequently, at the multi-class identifier, it is possible to suppress the overfitting as described in FIG. 13 and to improve identification performance.

Figure 3:
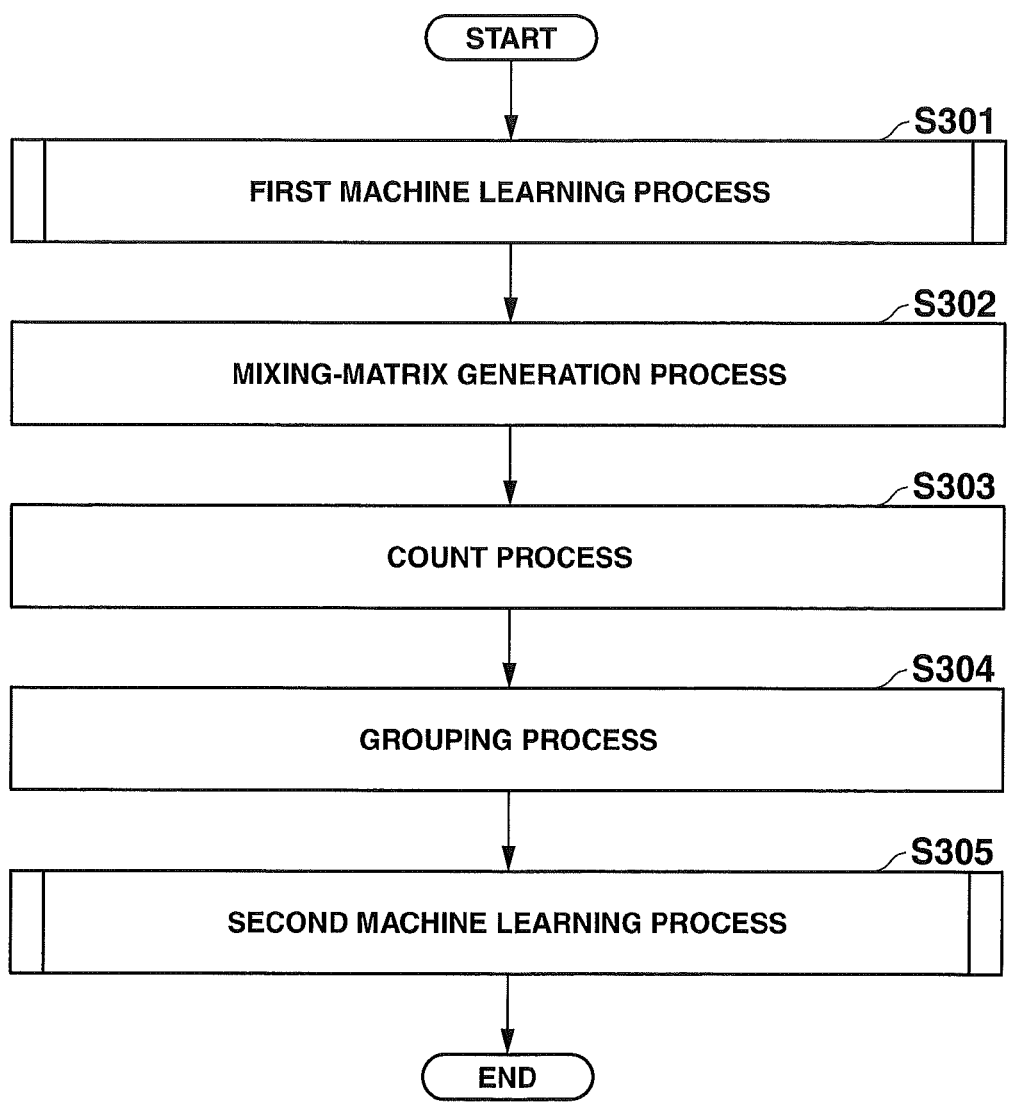
FIG. 3 is a flowchart illustrating overall operation of an image identifier generation process according to the present embodiment.

FIG. 3 is a flowchart illustrating overall operation of an image identifier generation process according to the present embodiment, the process being performed, when the multi-class identifier 101 illustrated in the hardware configuration of FIG. 1 operates as, for example, an image identifier, in order to realize functions illustrated in the functional block diagram of FIG. 2.

The process illustrated by this flowchart is realized, with the processes illustrated by the flowcharts from FIG. 6 and FIG. 8 to FIG. 12 which illustrate details of FIG. 3, as a process that the CPU 102 runs a control program stored in the ROM 103 in FIG. 1.

First, a first machine learning process is performed (step S301 of FIG. 3). In this process, the function of the first learner 201 of FIG. 2 mentioned above is performed. As a result, as illustrated in FIG. 2, K-pieces of kind identifiers 202 from #1 to #K are generated.

Next, a mixing-matrix generation process (step S302 of FIG. 3) is performed, and after that, a count process (step S303 of FIG. 3) is performed. The processes of these steps S302 and S303 realize the function of the identification fault counter 204 of FIG. 2.

In the mixing-matrix generation process of step S302, the data for test 205 including the class label of either of the K kinds is input into respective K-pieces of kind identifiers 202 from #1 to #K generated at step S301, and the kind of image of the data 205 is identified individually. As described in FIG. 2, following mixing-matrix data is used, when the number of times of mutual incorrect identification is counted, between two kinds which belong to the combination, for each combination of two kinds among K kinds, for example.

FIG. 4 is a drawing illustrating a configuration example of mixing-matrix data. The mixing-matrix data is a matrix data in which the identification results of the kinds of image of the data for test 205 in FIG. 2 are accumulated for each class label of the data 205, and is stored in the RAM 104 of FIG. 1. In the mixing-matrix data, the class label of data for test 205 which is input is assigned to each row. In an example of a data configuration in FIG. 4, K=6 kinds of class labels, a common dandelion, a Kanto dandelion, a sunflower, a tulip, a bindweed, and a false bindweed, are assigned. In addition, in the mixing-matrix data, the class labels of identified data for test 205 are assigned to each column. In the example of the data configuration in FIG. 4, the same class labels as rows are assigned to columns, respectively. In each element position where each row and each column intersect in the mixing-matrix data, the number of times of identifying the input class label assigned to the row corresponding to the element position as an output class label assigned to the column corresponding to the element position is accumulated.

In mixing-matrix data, the accumulated numbers of times at the element positions on a principal diagonal indicate the numbers of times of correct identification by each kind identifier 202 in FIG. 2. For example, at an element position where the row to which the common dandelion is assigned, and the column to which the common dandelion is assigned intersect, an identification number=15 times, which is the number that the identification result by the kind identifier 202 identifying the common dandelion is correct, is accumulated. Similarly, at intersect positions of respective rows and columns, to which the Kanto dandelion, the sunflower, the tulip, the bindweed, and the false bindweed are assigned, the identification numbers 15, 50, 50, 20 and 20 which have been each accumulated are the identification numbers for which the kind identifiers 202 correctly identified the kind.

On the other hand, at an element position where the row to which the common dandelion is assigned, and the column to which the Kanto dandelion is assigned intersect, the identification number=15 times is accumulated, which is the number of times that the kind identifier 202 identifying the Kanto dandelion incorrectly identifies the input data for test 205, which includes the class label of the common dandelion, as the Kanto dandelion. Similarly, in the row to which the common dandelion is assigned, in element positions at which the column to which the sunflower, the tulip, the bindweed, and the false bindweed are assigned intersects with the row, the identification numbers 5, 5, 5 and 5 which have been each accumulated are the numbers of times that respective kind identifiers 202 identifying the respective kinds incorrectly identify the input data for test 205 that includes the class label of the common dandelion as the image of above-described kinds.

Similarly, in the row to which the Kanto dandelion is assigned, in element positions at which the column to which the common dandelion, the sunflower, the tulip, the bindweed, and the false bindweed are assigned intersects with the row, the identification numbers 15, 5, 5, 5 and 5 which have been each accumulated are the numbers of times that respective kind identifiers 202 identifying the respective kinds incorrectly identify the input data for test 205 that includes the class label of the Kanto dandelion as the image of above-described kinds.

Similarly, in the row to which the bindweed is assigned, in element positions at which the column to which the common dandelion, the Kanto dandelion, the sunflower, the tulip, and the false bindweed are assigned intersects with the row, the identification numbers 5, 5, 0 (blank since there is no accumulated value), 0 (blank since there is no accumulated value) and 20 which have been each accumulated are the numbers of times that respective kind identifiers 202 identifying the respective kinds incorrectly identify the input data for test 205 that includes the class label of the bindweed as the image of above-described kinds.

Similarly, in the row to which the false bindweed assigned, in element positions at which the column to which the common dandelion, the Kanto dandelion, the sunflower, the tulip, and the bindweed are assigned intersects with the row, the identification numbers 5, 5, 0 (blank since there is no accumulated value), 0 (blank since there is no accumulated value) and 20 which have been each accumulated are the numbers of times that respective kind identifiers 202 identifying the respective kinds incorrectly identify the input data for test 205 that includes the class label of the false bindweed as the image of above-described kinds.

The kind identifiers 202 for the sunflower and the tulip did not occur any fault. Therefore, in the row to which the sunflower is assigned, the accumulated value at element positions other than the element position where the column to which the sunflower is assigned intersects with the row is 0 (blank since there is no accumulated value). Similarly, in the row to which the tulip is assigned, the accumulated value at element positions other than the element position where the column to which the tulip is assigned intersects with the row is 0 (blank since there is no accumulated value).

Figure 5:
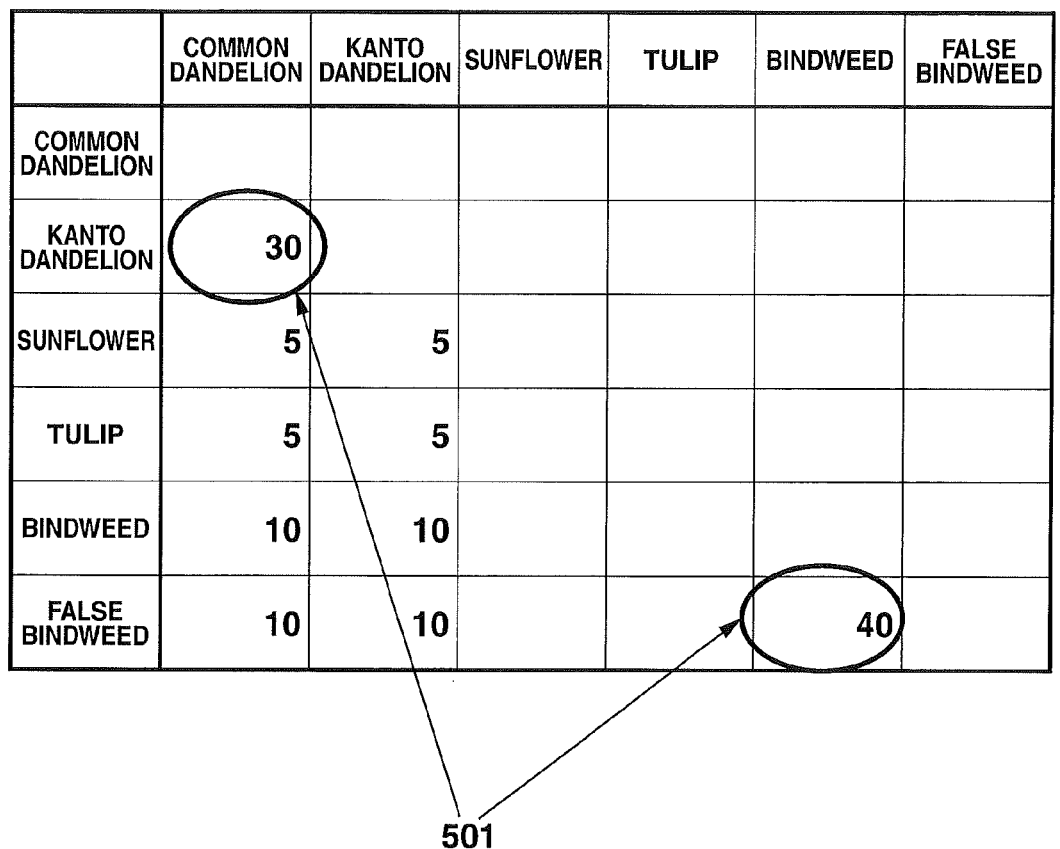
FIG. 5 is an explanatory diagram of a count process from the mixing-matrix data.

Next, in the count process of step S303 of FIG. 3, in the mixing-matrix data generated on the RAM 104 in FIG. 1 at step S302, for example, the number of times of mutual incorrect identification between two kinds which belong to the combination is counted, for each combination of arbitrary two kinds among K kinds, as each added result in which the data of respective diagonal components of element positions other than the element positions on the principal diagonal are added, respectively. FIG. 5 is an explanatory diagram of a count process from mixing-matrix data.

For example, in the mixing-matrix data of FIG. 4, attention is paid to the accumulated value=15 times, of the element position where the row to which the common dandelion is assigned, and the column to which the Kanto dandelion is assigned intersect. In addition, attention is paid to the accumulated value=15 times, of the element position which is a diagonal component of above-described element position, and where the row to which the Kanto dandelion is assigned, and the column to which the common dandelion is assigned intersect. Then, as illustrated in FIG. 5, the accumulated value which is the result of adding data of these diagonal components, that is, 30 times, is overwritten on the element position where the row to which the Kanto dandelion is assigned, and the column to which the common dandelion is assigned intersect. In addition, the accumulated value of the element position where the row to which the common dandelion is assigned, and the column to which the Kanto dandelion is assigned intersect is cleared.

Similarly, with respect to the row and the column in the mixing-matrix data of FIG. 4, as illustrated in FIG. 5, the accumulated value which is the result of adding data of the diagonal components between the sunflower and the common dandelion and between the common dandelion and the sunflower, that is 5, is overwritten on the intersecting element position between the row=sunflower and the column=common dandelion. In addition, the accumulated value at the intersecting element position of the row=common dandelion and the column=sunflower is cleared.

With respect to respective other diagonal components which are the combinations of the sunflower and the Kanto dandelion, the tulip and the common dandelion, the tulip and the Kanto dandelion, the bindweed and the common dandelion, the bindweed and the Kanto dandelion, the false bindweed and the common dandelion, and the false bindweed and the Kanto dandelion, counting is similarly performed. Then, the mixing-matrix data illustrated in FIG. 5 is obtained.

According to the process of step S303 of FIG. 3 mentioned above, as the counted value of each element position of a region of lower triangular matrix of the mixing-matrix data illustrated in FIG. 5 on the RAM 104 of FIG. 1, for example, for each combination of arbitrary two kinds among K kinds, the number of times of mutual incorrect identification between two kinds which belong to the combination is counted.

Returning to the process of the flowchart of FIG. 3, and a grouping process is performed after the process of step S303 (step S304 of FIG. 3). In this process, the function of the grouping processor 206 of FIG. 2 is performed. Specifically, at the region of lower triangular matrix of the mixing-matrix data obtained by counting of step S303 on the RAM 104 of FIG. 1, a group of the combination in which a counted result is equal to or greater than, for example, 25 times which is a half value of the number of all correct identification=50 times is extracted. In the example of FIG. 5, a group (counted value=30 times) of two kinds of combination of the Kanto dandelion and the common dandelion, and a group (counted value=40 times) of two kinds of combination of the false bindweed and the bindweed, are extracted as illustrated as 501.

Next, at step S304, the group label corresponding to each group is added to the data for learning 203 that includes the class label corresponding to either of two kinds that belongs to these two groups, for example, respectively. For example, to the data for learning 203 that includes the class label of the Kanto dandelion and the data for learning 203 that includes the class label of the common dandelion, the group label corresponding to the group to which the Kanto dandelion and the common dandelion belongs, for example, a "dandelion group", is additionally added. In addition, to the data for learning 203 that includes the class label of the false bindweed and the data for learning 203 that includes the class label of the bindweed, the group label corresponding to the group to which the false bindweed and the bindweed belongs, for example, a "bindweed group", is additionally added.

A second machine learning process is performed after the grouping process of step S304 (step S305 of FIG. 3). In this process, the function of the second learner 207 of FIG. 2 is performed.

Figure 6:
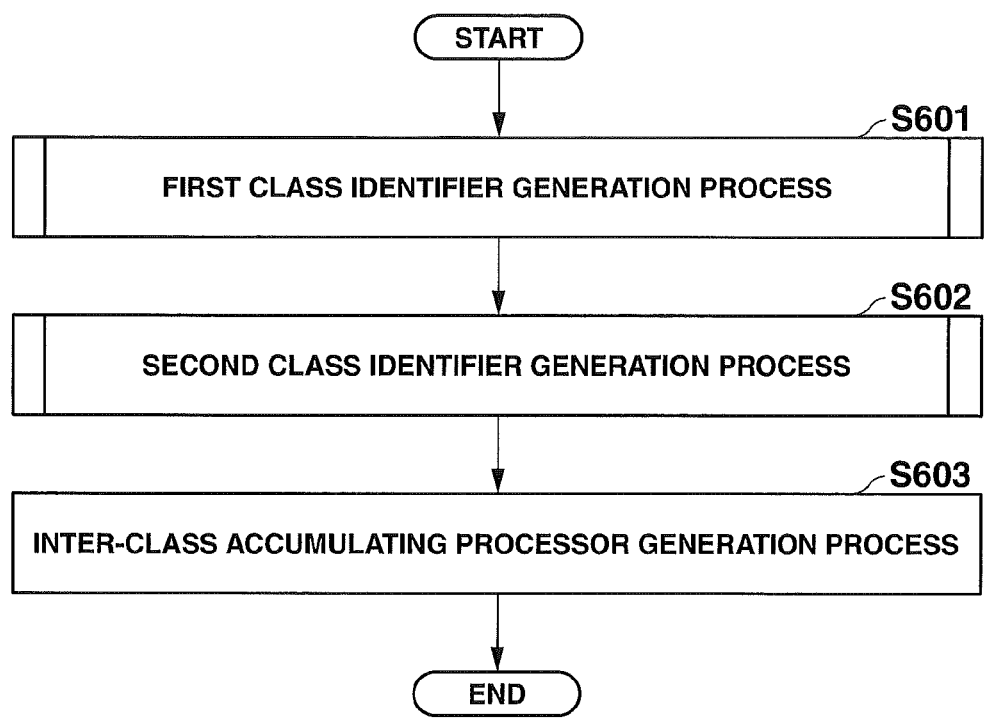
FIG. 6 is a flowchart illustrating a detailed control process of a second machine learning process.
Figure 7:
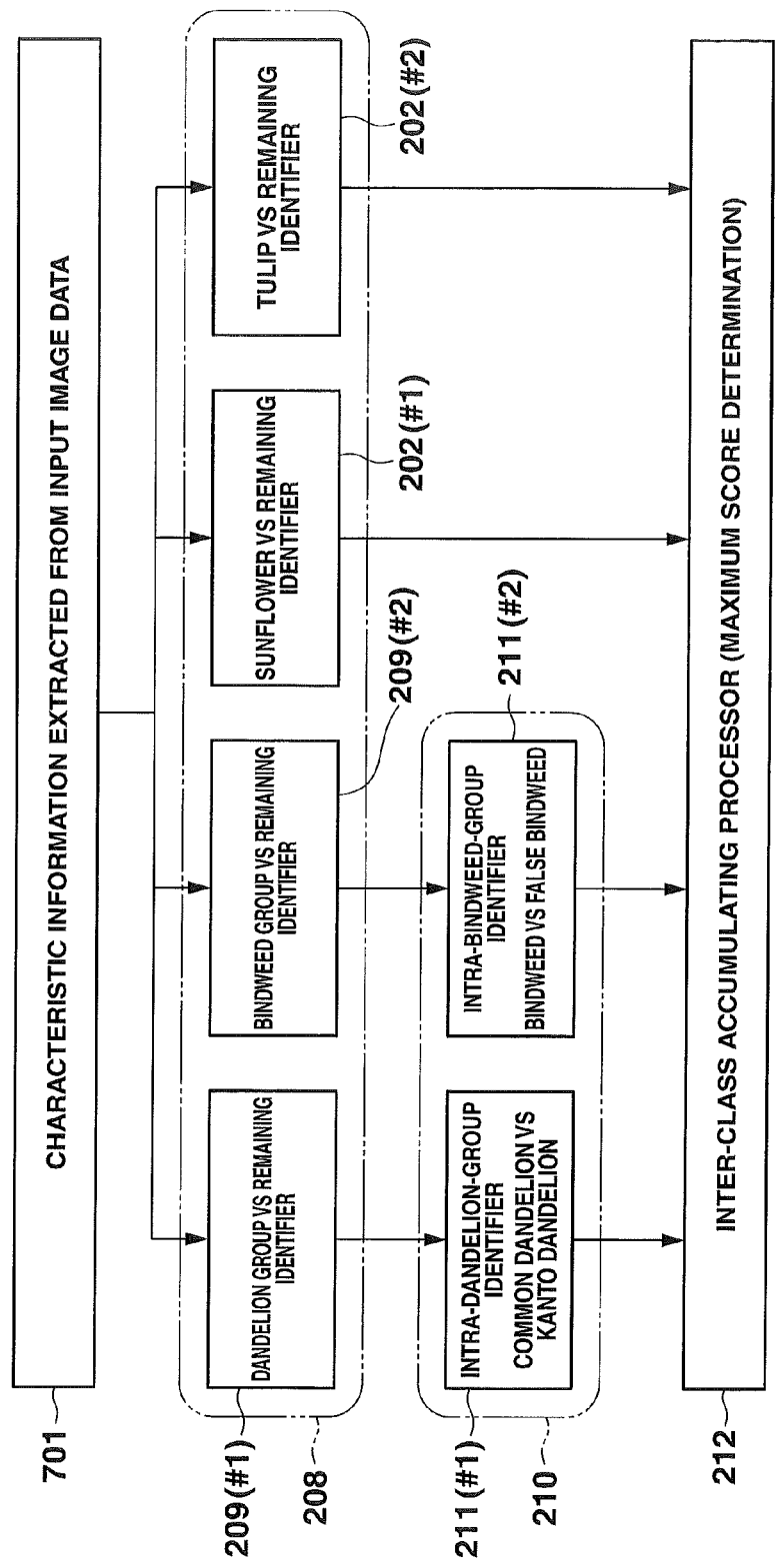
FIG. 7 is an explanatory diagram of an identifier configured in the present embodiment.

FIG. 6 is a flowchart illustrating the second machine learning process in the step S305 of FIG. 3, and FIG. 7 is an explanatory diagram of an identifier configured in the present embodiment by the second machine learning process.

First, a first class identifier generation process is performed (step S601 of FIG. 6). This process is as described above for the second learner 207 of FIG. 2. As a result, as illustrated in FIG. 7, two group identifiers 209 (#1 and #2) are generated which correspond to the dandelion group and the bindweed group, respectively. In the example of FIG. 7, the group identifier 209 (#1) is realized as an identifier for two classes which classifies images in two patterns whether the characteristic information 701 extracted from input image data is characteristic information for image of a kind belonging to the dandelion group or other characteristic information. Similarly, the group identifier 209 (#2) is realized as an identifier for two classes which classifies images in two patterns whether the characteristic information 701 extracted from input image data is characteristic information for image of a kind belonging to the bindweed group or other characteristic information.

Next, at step S601, the above-described group identifiers 209 are combined with the kind identifiers 202 which identify individually the kind which belong to neither of above-mentioned groups among the kind identifiers 202 generated at step S301 of FIG. 3, to form the first class identifier 208. In the example of FIG. 7, the group identifiers 209 (#1 and #2) are combined with the kind identifiers 202 (#1 and #2) which identify individually the sunflower and tulip belonging to neither the dandelion group nor the bindweed group, to form the first class identifier 208.

Next, a second class identifier generation process is performed (step S602 of FIG. 6).

This process is also as described above for the second learner 207 of FIG. 2. As a result, as illustrated in FIG. 7, for example, with respect to the dandelion group, the intra-group identifier 211 (#1) is generated which identifies individually two kinds of the Kanto dandelion and the common dandelion in the dandelion group. Moreover, with respect to the bindweed group, the intra-group identifier 211 (#2) is generated which identifies individually two kinds of the bindweed and the false bindweed in the bindweed group. In this process, the intra-group identifiers 211 are constituted, in some cases, using the data for learning 203 that includes only the class label corresponding to the kind belonging to the group. Alternatively, in some cases, the intra-group identifier 211 for each kind, which identifies one of kinds in the group versus others, is constituted using all the data for learning 203 that includes the class label.

Next, an inter-class accumulating processor generation process is performed (step S603 of FIG. 6). In this process, the function processing of the inter-class accumulating processor 212 of FIG. 2 is generated.

The inter-class accumulating processor 212 performs an identification judging for the image of each group in accordance with an identification score value obtained by adding the identification score value of the first class identifier 208 corresponding to the group, and a value in which an identification score value of the second class identifier 210 is multiplied by predetermined magnification. In other words, the total identification score value is

[Total identification score value]=[Identification score value of first class identifier 208]+α×[Identification score value of second class identifier 210].

For example:

[Total identification score value of Kanto dandelion]= [Identification score value of dandelion group]+ α×[Identification score value of Kanto dandelion versus common dandelion]

Moreover, the inter-class accumulating processor 212 performs an identification judging for the image of the kind belonging to neither of the above-described groups in accordance with the identification score value of the first class identifier 208 corresponding to the kind. In other words, the total identification score value is

[Total identification score value]=[Identification score value of first class identifier 208]

For example:

[Total identification score value of sunflower]=[Identification score value of sunflower]

According to the functional block configuration illustrated in FIG. 2 mentioned above, in the present embodiment, the two-class identifier, which includes the first class identifier 208 that performs identification for the group unit and the second class identifier 210 that performs identification for the image in the group, is realized, in order to avoid the overfitting in the multi-class classification of the image in which close resemblance kinds are included. In this case, according to the present embodiment, when determining a group, the kind identifier 202 which performs identification by machine learning in a state where grouping is not performed, is generated in advance by the first learner 201. Next, an identification test is performed by the identification fault counter 204 using the kind identifiers 202, and the number of times of occurring of an identification fault between categories is counted. Then, the categories in which the machine learning tends to make a mistake are grouped by the grouping processor 206.

Figure 13:
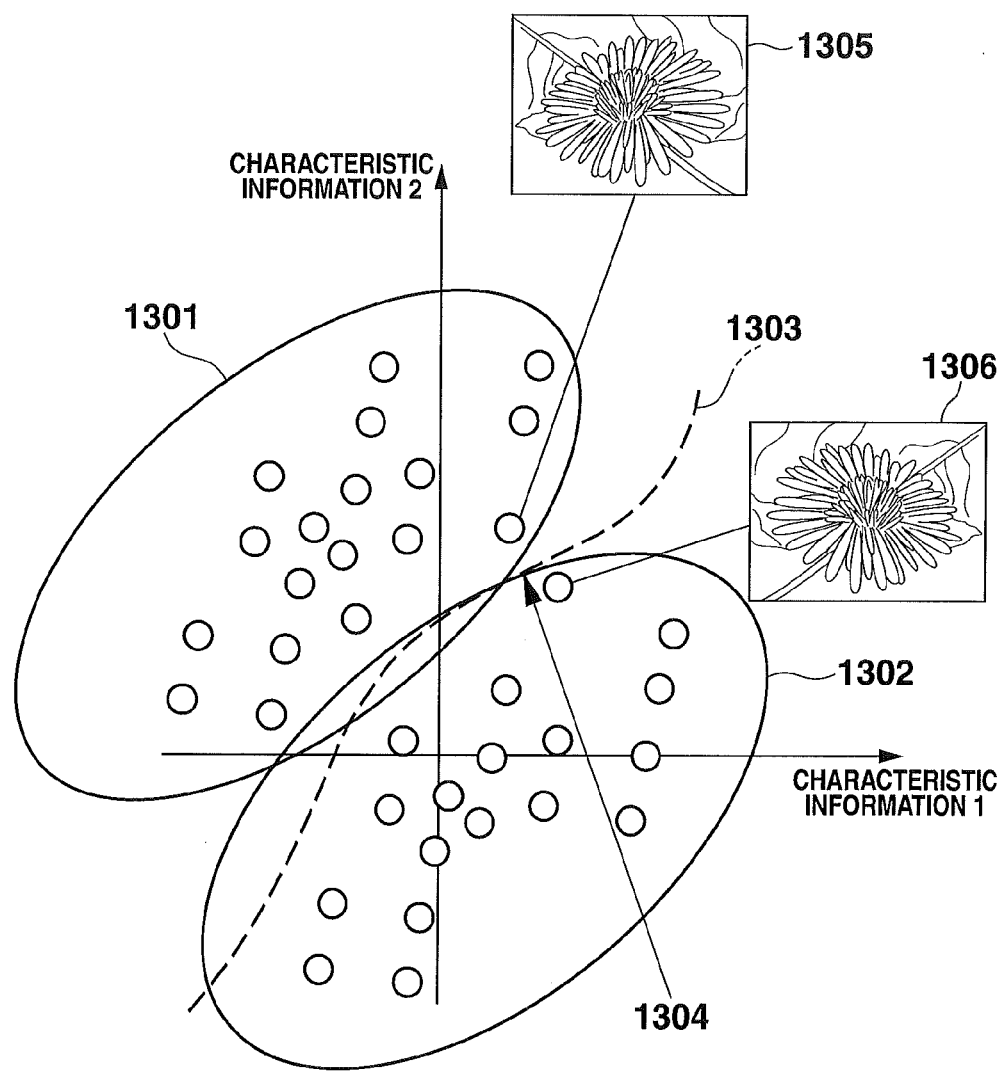
FIG. 13 is an explanatory diagram of a problem (overfitting) in a conventional technique.

In this way, according to the present embodiment, it is possible to determine and classify close resemblance kinds automatically by the count of the identification fault performed in advance, and using the result, two-class identification of the identification between groups and the identification in a group is performed. As a result, at the image identifier, an overfitting which is described in FIG. 13 is suppressed, and it is possible to improve identification performance.

Figure 8:
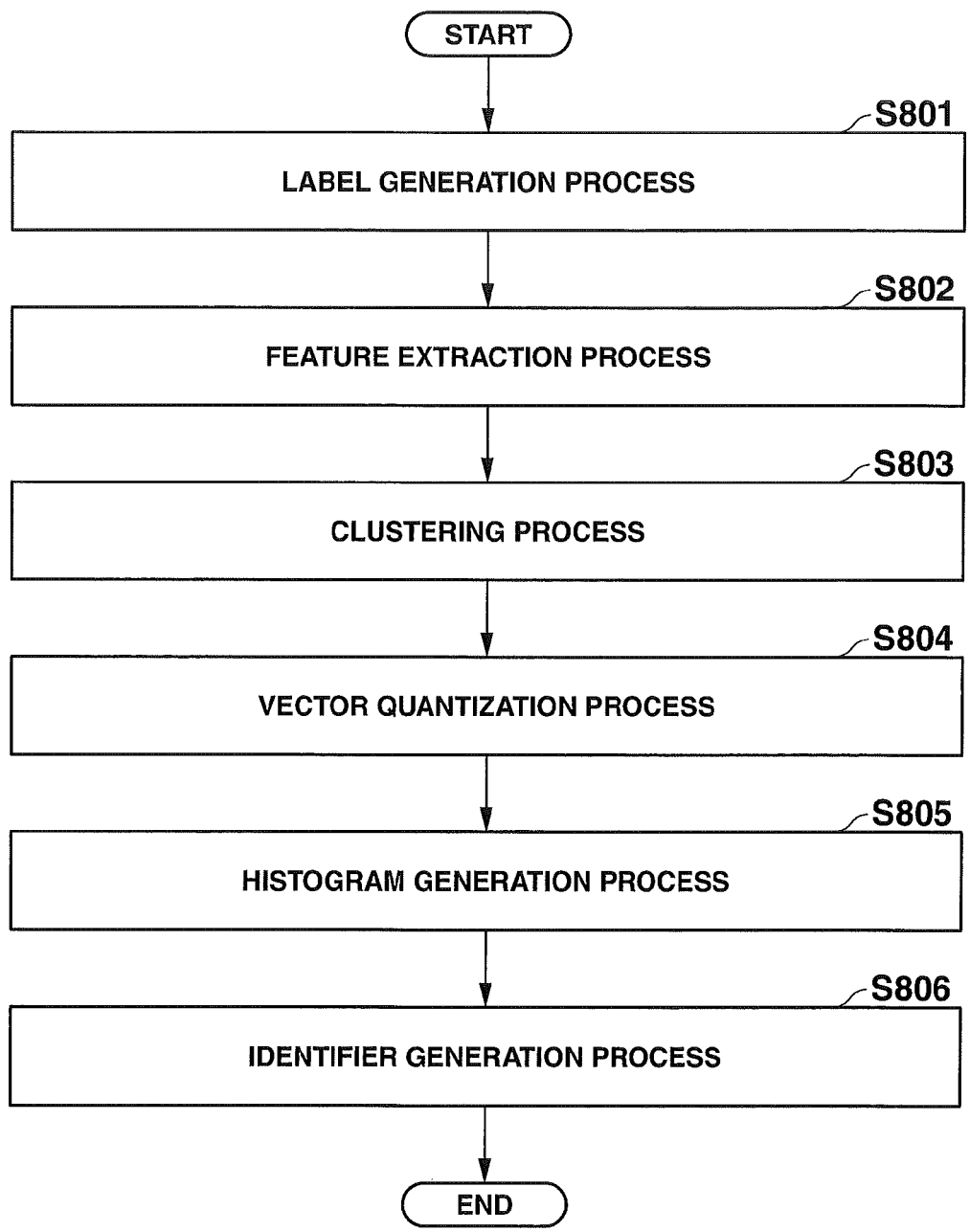
FIG. 8 is a flowchart illustrating a detailed control process for identifier generation.

FIG. 8 is a flowchart illustrating the process of generating the identifiers such as the kind identifiers 202, the group identifiers 209, or the intra-group identifiers 211 at the step S301 of FIG. 3, the step S601 of FIG. 6, or the step S602 of FIG. 6.

First, a label generation process is performed (step S801). In this process, to each input data for learning 203 for a plurality of kinds x a plurality of sheets, the class label indicating the kind of image which the data indicates is added.

Next, a feature extraction process is performed (step S802). In this process, for each data for learning 203, RGB data is extracted as characteristic information, for every designated pixel on the major photographic subject region which indicates an object being an identification subject included in the data for learning 203. The characteristic information is stored in the RAM 104 of FIG. 1.

Next, a clustering process is performed (step S803). In this process, the characteristic information extracted at step S802 is clustered into a plurality of clusters (for example, 500 pieces), for example using the clustering algorithm of the k-means method.

Next, a vector quantization process is performed (step S804). In this process, the following process is performed on each data for learning 203. For each characteristic information item which has been acquired for every designated pixel on the major photographic subject region at step S802, and has been stored in the RAM 104 of FIG. 1, a distance between the characteristic information and the RGB data at the center of gravity of each cluster calculated at step S803 is calculated, respectively. Then, the cluster corresponding to the minimum distance among the calculated distances is extracted as a nearest neighbor cluster, and the center of gravity data of the extracted nearest neighbor cluster is referred to as a vector quantization value of the characteristic information. The vector quantization value is stored in the RAM 104 of FIG. 1.

Next, a histogram process is performed (step S805). In this process, on each data for learning 203, for each vector quantization value which has been referred at step S804, and has been stored in the RAM 104 of FIG. 1, the process is repeatedly performed in which the histogram frequency of the nearest neighbor cluster corresponding to the vector quantization value is added by 1. Accordingly, the histogram corresponding to the data for learning 203 is generated.

Finally, an identifier generation process is performed (step S806). In this process, based on the class label or group label of data for learning 203 or 203', and the histogram generated for each data for learning 203, the kind identifiers 202, the group identifiers 209, or the intra-group identifiers 211 which outputs a greatest identification score value when respective images of kinds to be identified or the images of kinds constituting a group to be identified is input, is generated.

In above-described process of generating the identifier, it is only necessary to perform a series of processes from steps S801 to S805 of FIG. 8 only one time for each data for learning 203 in the process of generating the kind identifiers 202, and to hold the result in the RAM 104 of FIG. 1. Then, at the process of generating the group identifiers 209 or the intra-group identifiers 211, if the execution result of steps S801 to S805 held in the RAM 104 is read and step S806 of FIG. 8 is performed, it is possible to accelerate the process.

Figure 9:
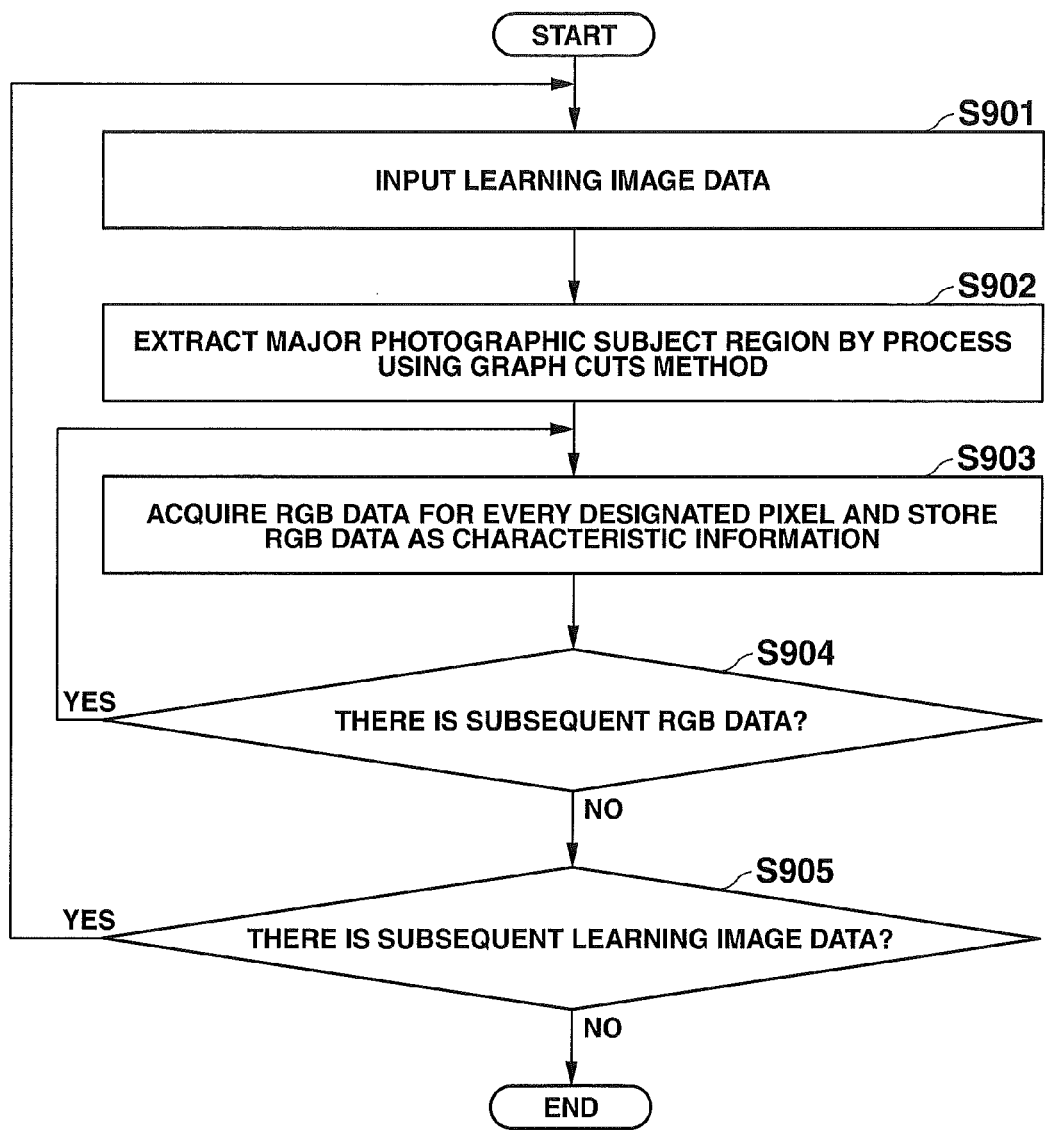
FIG. 9 is a flowchart illustrating a feature extraction process.

FIG. 9 is a flowchart illustrating the feature extraction process in the step S802 of FIG. 8. In this process, a series of processes from steps S901 to S904 are performed, unless it is determined that there is no data for learning 203 to be processed at step S905. At each step S901, data for learning 203 is input by one sheet (one image).

After the data for learning 203 for one sheet is input at step S901, first, the major photographic subject region is extracted from the data for learning 203 by a process using the Graph Cuts method (step S902 of FIG. 9). For example, in the case of the image of a flower, a region of the part of the flower is extracted. Specifically, the major photographic subject region is separately acquired from background region, in accordance with the algorithm of the Graph Cuts method which uses an energy function indicating major photographic subject-likeness to the input data for learning 203. As for a concrete algorithm of the Graph Cuts method, a technique described in Unexamined Japanese Patent Application Kokai Publication No. 2011-035636 is applicable, for example.

Next, unless it is determined that RGB data is no longer acquired at step S904, RGB data is acquired from the data for learning 203 for every designated pixel, and a process is performed which stores the data as the characteristic information in the RAM 104 of FIG. 1 (repetitive operations of steps S903 and S904 of FIG. 9).

When the process is completed for all RGB data for every designated pixel on the data for learning 203, it is determined whether or not there is subsequent data for learning 203 (step S905 of FIG. 9).

If determination result of step S905 is YES, it returns to the process of step S901, and a series of processes from steps S901 to S904 are repeated.

When the feature extraction process to all data for learning 203 is completed and thereby determination result of step S905 is NO, the feature extraction process of step S802 of FIG. 8 illustrated in the flowchart of FIG. 9 is terminated.

Figure 10:
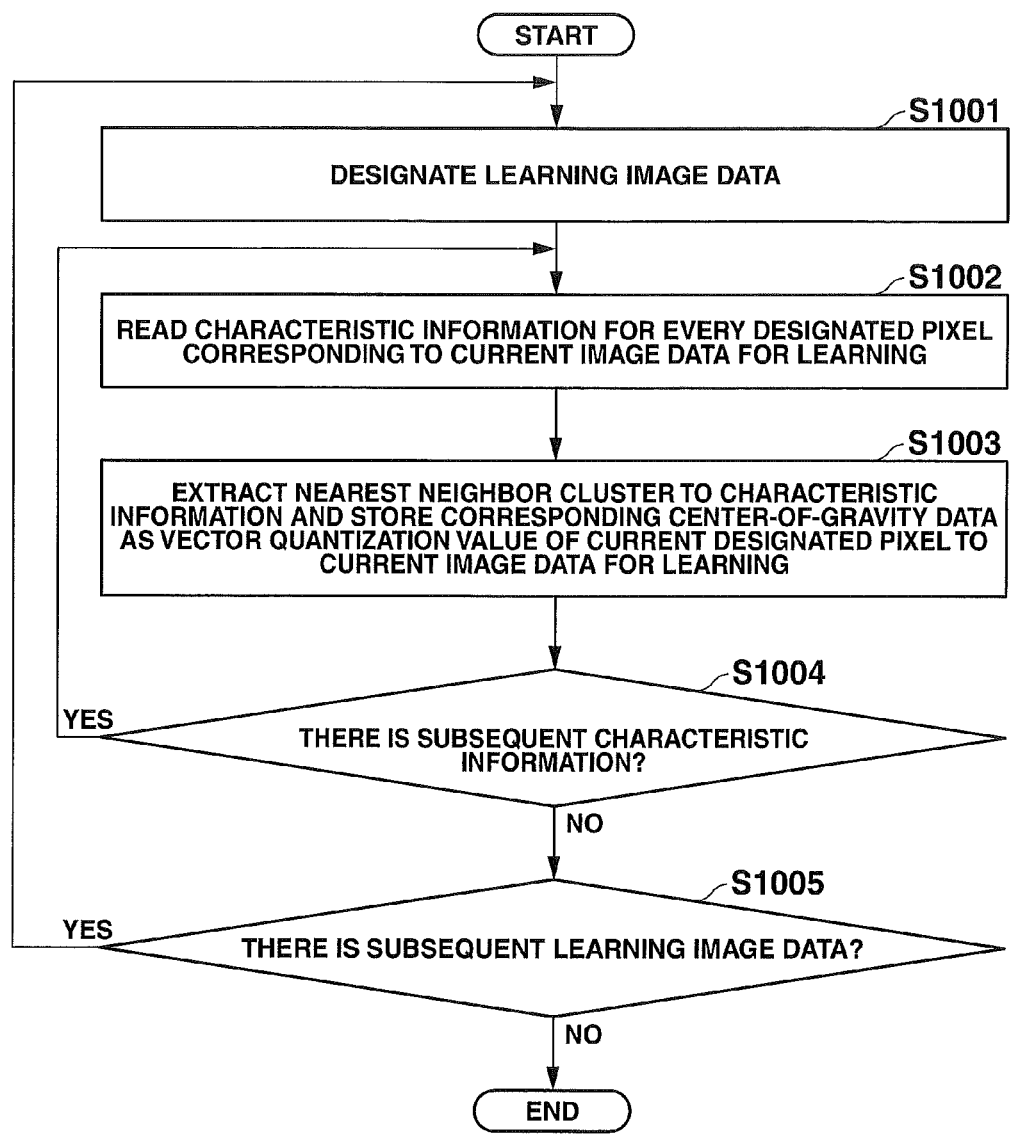
FIG. 10 is a flowchart illustrating a vector quantization process.

FIG. 10 is a flowchart illustrating the vector quantization process in the step S804 of FIG. 8.

In this process, a series of processes from steps S1001 to S1004 are performed, unless it is determined that there is no data for learning 203 to be designated at step S1005. At each step S1001, data for learning 203 is designated by one sheet (one image).

After the data for learning 203 is designated at step S1001, the processes of steps S1002 and S1003 are repeatedly performed unless it is determined that the characteristic information corresponding to the data for learning 203 is no longer acquired from the RAM 104 of FIG. 1 at step S1004, First, the characteristic information for every designated pixel corresponding to the current data for learning 203 is read from the RAM 104 of FIG. 1 (step S1002 of FIG. 10). Next, a distance between the read characteristic information and the RGB data of the center of gravity of each cluster calculated at step S803 is calculated, respectively. Then, the cluster which has the minimum distance among the calculated distances is extracted as the nearest neighbor cluster, the center-of-gravity data of the extracted nearest neighbor cluster is referred to as a vector quantization value of the characteristic information, and the vector quantization value is stored in the RAM 104 of FIG. 1 (step S1003 of FIG. 10).

Next, it is determined whether or not the characteristic information for every designated pixel corresponding to the current data for learning 203 is still on the RAM 104 (step S1004 of FIG. 10).

If determination result of step S1004 is YES, it returns to the process of step S1002, and processes of steps S1002 and S1003 are repeated to subsequent characteristic information.

When the vector quantization to all characteristic information is completed and thereby determination result of step S1004 is NO, it is determined whether or not there is the subsequent data for learning 203 (step S1005 of FIG. 10).

If determination result of step S1005 is YES, it returns to the process of step S1001 and a series of processes from steps S1001 to S1004 are repeated.

When the vector quantization process to all data for learning 203 is completed, and thereby determination result of step S1005 is NO, the vector quantization process of step S804 of FIG. 8 illustrated in the flowchart of FIG. 10 is terminated.

Figure 11:
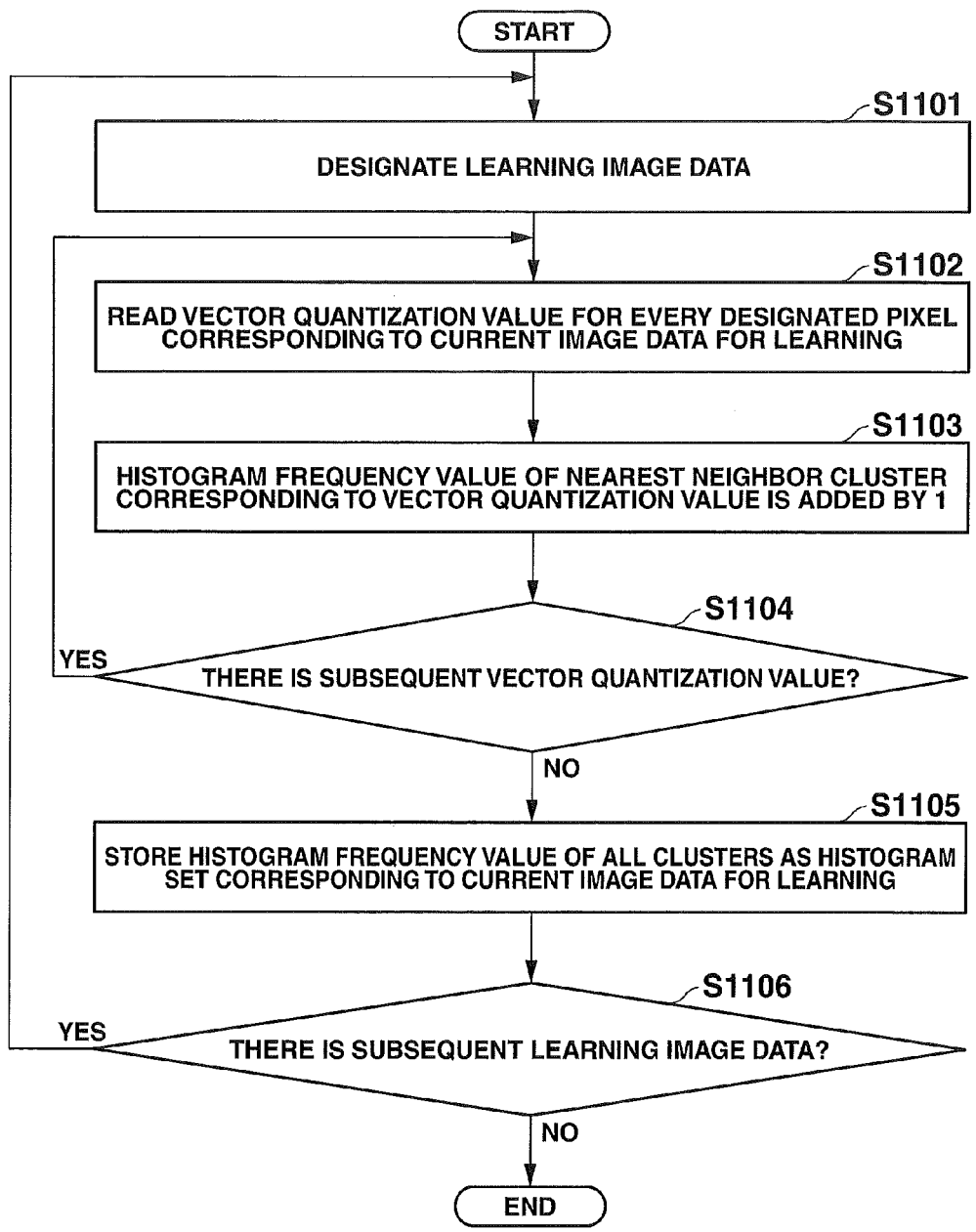
FIG. 11 is a flowchart illustrating a histogram generation process.

FIG. 11 is a flowchart illustrating the histogram generation process in the step S805 of FIG. 8.

In this process, a series of processes from steps S1101 to S1105 are performed, unless it is determined that there is no data for learning 203 to be designated at step S1106. At each step S1101, data for learning 203 is designated by one sheet (one image).

After the data for learning 203 is designated at step S1101, the processes of steps S1102 and S1103 are repeatedly performed unless it is determined that the vector quantization value corresponding to the data for learning 203 is no longer acquired from the RAM 104 of FIG. 1 at step S1104.

First, the vector quantization value for every designated pixel corresponding to the current data for learning 203 is read from the RAM 104 of FIG. 1 (step S1102 of FIG. 11).

Next, the histogram frequency stored in the RAM 104 of the nearest neighbor cluster corresponding to the read vector quantization value is added by 1 (step S1103 of FIG. 11).

Next, it is determined whether or not the vector quantization value for every designated pixel corresponding to the current data for learning 203 is still on the RAM 104 (step S1104 of FIG. 11).

If determination result of step S1104 is YES, it returns to the process of step S1102, and processes of steps S1102 and S1103 are repeatedly performed to subsequent vector quantization value.

When the histogram count to all vector quantization values is completed, and thereby determination result of step S1104 is NO, the following process is performed. The histogram frequency value of all clusters stored in the RAM 104 of FIG. 1 is stored in the RAM 104 as a histogram set corresponding to the current data for learning 203 (step S1104 of FIG. 11).

After that, it is determined whether or not there is subsequent data for learning 203 (step S1106 of FIG. 11).

If determination result of step S1106 is YES, it returns to the process of step S1101, and a series of processes from steps S1101 to S105 are repeated.

When the histogram generation process to all data for learning 203 is completed, and thereby determination result of step S1106 is NO, the histogram generation process of step S805 of FIG. 8 illustrated in the flowchart of FIG. 11 is terminated.

Figure 12:
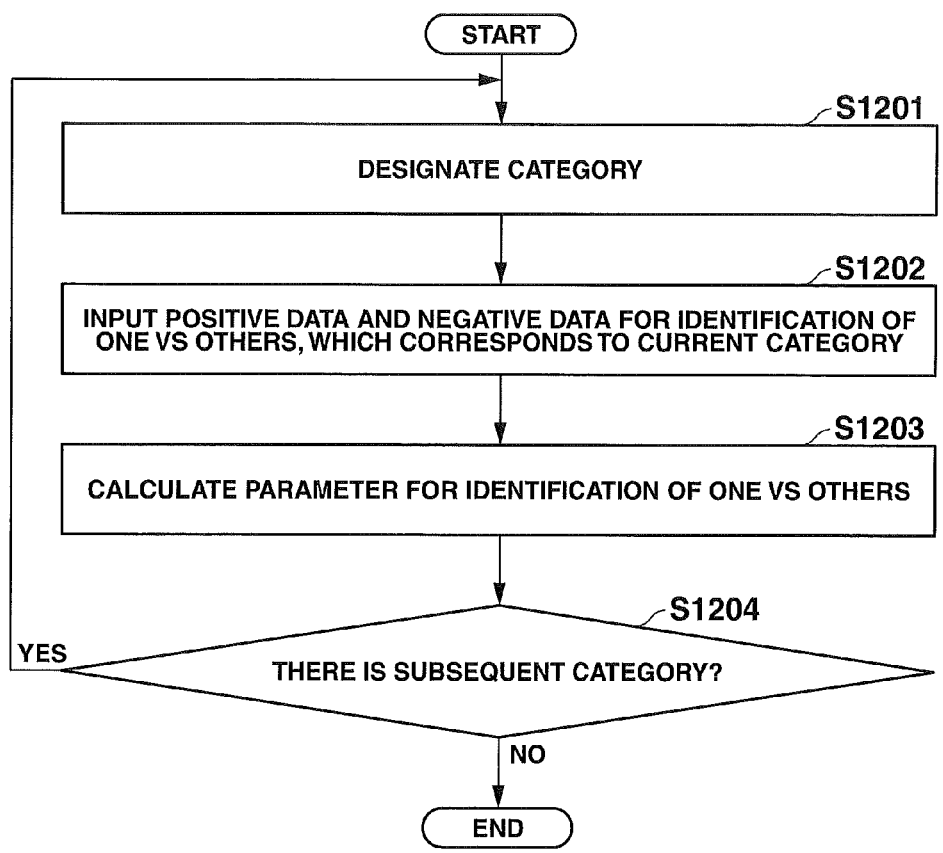
FIG. 12 is a flowchart illustrating an identifier generation process.

FIG. 12 is a flowchart illustrating the identifier generation process in the step S806 of FIG. 8.

First, a category which indicates the individual kinds to be identified, or the group to be identified is designated (step S1201 of FIG. 12).

Next, positive data and negative data for identification of one versus others, which corresponds to the current category are input (step S1202 of FIG. 12). For example, when the category is a kind of flower, the data for learning 203 or 203' (FIG. 2) that includes the class label corresponding to the kind is used as the positive data. Moreover, the data for learning 203 or 203' that includes the class label of a kind other than the kind is used as the negative data. On the other hand, when a category is a group of the kind of flower, for example, the data for learning 203' that includes the group label corresponding to the group is used as the positive data. Moreover, the data for learning 203' that includes the class label corresponding to a kind other than the kinds included in the group is used as the negative data.

The following process is performed based on the class label or group label of each data for learning 203 or 203', and the histogram generated at step S805 of FIG. 8 for each data for learning 203. The parameter for identification of one versus others in the kind identifiers 202, the group identifiers 209, or the intra-group identifiers 211 is calculated so as to output the greatest identification score value when respective images of kinds to be identified or the images of kinds constituting a group to be identified is input (step S1203 of FIG. 12).

After that, it is determined whether or not the subsequent category (the kind or the group) has been designated (step S1204 of FIG. 12).

If determination result of step S1204 is YES, it returns to the process of step S1201, and the generation process of the identifier corresponding to a new category is performed.

When there is no category and determination result of step S1204 is NO, the identifier generation process of step S806 of FIG. 8 illustrated in the flowchart of FIG. 12 is terminated.

In the embodiment described above, although description is made using an image of a flower as the object of identification, the present invention is not limited to this example. Moreover, the process which extracts the major photographic subject region from the image data is not limited to the process of the Graph Cuts method, and extraction for the major photographic subject region is not necessarily required.

Furthermore, although the present embodiment is described using a case of identification of the image represented by the flower, it is not limited to an image and it is applicable to an identification of voice data or data group indicating predetermined characteristics. In other words, when trying to perform multi-class classification by machine learning, the present invention is applicable to a part with poor classification performance (there is overlap) between classes. For example, also for a voice, by identifying in two steps for a good discreteness part and a resemble part, it is possible to increase an identification precision.

Having described above, according to the present embodiment, it is possible to classify by automatically determining close resemblance kinds by counting identification fault in advance. Using the result, two-class identification including identification between groups and the identification in a group is performed. As a result, at an image identifier, it is possible to suppress an overfitting and to improve identification performance.

Moreover, according to the present embodiment, it is possible to avoid unnatural identification which gives people a feeling of strangeness in a manner in which a first identification candidate is a Kanto dandelion, a second identification candidate is a sunflower, and a third identification candidate is a common dandelion.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A multi-class identifier comprising:
a CPU which is configured to:
perform a first learning processing of (i) receiving a plurality of first pieces of characteristic data for learning, each of the first pieces of characteristic data including a class label corresponding to one of a plurality of kinds, and (ii) generating kind identifiers based on the received first pieces of characteristic data, each of the kind identifiers individually identifying a kind of a respective one of the first pieces of characteristic data;
perform an identification fault count processing of (i) providing a plurality of second pieces of characteristic data for testing to the kind identifiers so that each of the kind identifiers individually identifies a kind of a respective one of the provided second pieces of characteristic data, each of the second pieces of characteristic data including one of a plurality of class labels, and (ii) counting, for a combination of an arbitrary number of kinds from among the plurality of kinds, a number of times that an incorrect determination is made with respect to the kinds belonging to the combination;
perform a grouping processing of adding, for a group of the combination for which a result of the counting is equal to or greater than a predetermined threshold, a group label corresponding to the group, the group label being added to pieces of the characteristic data for learning that include a class label corresponding to one of the arbitrary number of kinds belonging to the group;

perform a second learning processing of (i) receiving the pieces of characteristic data for learning to which the group label has been added, (ii) generating a group identifier based on the received pieces of characteristic data that identifies the group of the received pieces of characteristic data, (iii) forming a first class identifier by combining the group identifier and a kind identifier that identifies a kind being excluded from the group, and (iv) generating an intra-group identifier that identifies an arbitrary number of kinds of characteristic data belonging to the group, to form a second class identifier; and generate an inter-class accumulating processor that (i) performs an identification judging processing according to an identification score value obtained by adding an identification score value of the first class identifier corresponding to the group, and a value in which an identification score value of the second class identifier is multiplied by a predetermined magnification, with respect to the group, and (ii) performs an identification judging processing according to the identification score value of the first class identifier with respect to the kind being excluded from the group.

2. The multi-class identifier according to claim 1, wherein the plurality of first pieces of characteristic data are a plurality of first images, and the plurality of second pieces of characteristic data are a plurality of second images.

3. The multi-class identifier according to claim 2, wherein performing the identification fault count processing comprises:

performing a mixing-matrix generation process of (i) generating mixing-matrix data, the mixing-matrix data being matrix data in which identification results of the kinds of the second images for testing are accumulated for each class label thereof, the class labels of the second images for testing being assigned to each row and class labels of the identified kinds of the second images for testing being assigned to each column in the mixing-matrix data, and (ii) accumulating, in each element position where a row and a column intersect in the mixing-matrix data, a number of times of identifying a kind corresponding to the class label assigned to the row corresponding to the element position as a kind corresponding to the class label assigned to the column corresponding to the element position; and performing a count processing of counting, in the mixing-matrix data, a number of times of mutual incorrect identification between two arbitrary kinds belonging to the combination from among the plurality of kinds, as an added result in which a number of times of respective diagonal components of element positions other than element positions on the principal diagonal is added.

4. A multi-class identifier comprising:

a CPU which is configured to:

perform a first learning processing of (i) receiving a plurality of first images for learning, each of the first images including a class label corresponding to one of a plurality of kinds, and (ii) generating kind identifiers based on the received first images, each of the kind identifiers individually identifying a kind of a respective one of the first images;

perform an identification fault count processing of (i) providing a plurality of second images for testing to the kind identifiers so that each of the kind identifiers individually identifies a kind of a respective one of the provided second images, each of the second images including one of a plurality of class labels, and (ii) counting, for a combination of an arbitrary number of kinds from among the plurality of kinds, a number of times that an incorrect determination is made with respect to the kinds belonging to the combination;

perform a grouping processing of adding, for a group of the combination for which a result of the counting is equal to or greater than a predetermined threshold, a group label corresponding to the group, the group label being added to images among the first images for learning that include a class label corresponding to one of the arbitrary number of kinds belonging to the group; and perform a second learning processing of (i) receiving the images among the first images for learning to which the group label has been added, (ii) generating a group identifier based on the received images among the first images for learning that identifies the group of the received images among the first images for learning, (iii) forming a first class identifier by combining the group identifier and a kind identifier that identifies a kind being excluded from the group, and (iv) generating an intra-group identifier that identifies an arbitrary number of kinds of images belonging to the group, to form a second class identifier;

wherein at a time of generating one of the kind identifiers, the group identifiers, and the intra-group identifiers, the CPU is further configured to perform:

a feature extraction process in which, for each of the first images for learning, RGB data is extracted as characteristic information for every designated pixel in a major photographic subject region indicating an object that is an identification subject included therein;

a clustering process that clusters the characteristic information into a plurality of clusters;

a vector quantization process in which, for each of the first images for learning, and for each piece of characteristic information that has been acquired for every designated pixel in the major photographic subject region, (i) distances between the characteristic information and RGB data at a center of gravity of each cluster is calculated, respectively, (ii) a cluster corresponding to a minimum distance from among the calculated distances is extracted as a nearest neighbor cluster, and (iii) the calculated center of gravity of the extracted nearest neighbor cluster is set as a vector quantization value of the characteristic information;

a histogram generation process in which, for each of the first images for learning, and for each vector quantization value acquired for every designated pixel in the major photographic subject region, a process of adding 1 to a histogram frequency of a nearest neighbor cluster corresponding to the vector quantization value is repeatedly performed, to generate a histogram corresponding to the first image for learning; and an identifier generation process in which, based on the class label or group label of each of the first images for learning, and the histogram generated for each of the first images for learning, one of the kind identifier, the group identifier, and the intra-group identifier that outputs a greatest identification score value when respective images of kinds to be identified or images of kinds constituting a group to be identified are input, is generated.

5. The multi-class identifier according to claim 4, wherein the major photographic subject region is separately acquired from a background region in accordance with an algorithm of a Graph Cuts method that uses an energy function indicating major photographic subject-likeness to an image.

6. A multi-class identification method comprising:
a first learning step of (i) receiving a plurality of first pieces of characteristic data for learning, each of the first pieces of characteristic data including a class label corresponding to one of a plurality of kinds, and (ii) generating kind identifiers based on the received first pieces of characteristic data, each of the kind identifiers individually identifying a kind of a respective one of the first pieces of characteristic data;
an identification fault counting step of (i) providing a plurality of pieces of second characteristic data for testing to the kind identifiers so that each of the kind identifiers individually identifies a kind of a respective one of the provided second pieces of characteristic data, each of the second pieces of characteristic data including one of a plurality of class labels, and (ii) counting, for a combination of an arbitrary number of kinds from among the plurality of kinds, a number of times than an incorrect determination is made with respect to the kinds belonging to the combination;
a grouping processing step of adding, for a group of the combination for which a result of the counting is equal to or greater than a predetermined threshold, a group label corresponding to the group, the group label being added to pieces of the characteristic data for learning that include a class label corresponding to one of the arbitrary number of kinds belonging to the group;
a second learning step of (i) receiving the pieces of characteristic data for learning to which the group label has been added, (ii) generating a group identifier based on the received pieces of characteristic data that identifies the group of the received pieces of characteristic data, (iii) forming a first class identifier by combining the group identifier and a kind identifier that identifies a kind being excluded from the group, and (iv) generating an intra-group identifier that identifies an arbitrary number of kinds of characteristic data belonging to the group, to form a second class identifier; and
a step of generating an inter-class accumulating processor that (i) performs an identification judging processing according to an identification score value obtained by adding an identification score value of the first class identifier corresponding to the group, and a value in which an identification score value of the second class identifier is multiplied by a predetermined magnification, with respect to the group, and (ii) performs an identification judging processing according to the identification score value of the first class identifier with respect to the kind being excluded from the group.

7. A multi-class identification method comprising:
a first learning step of (i) receiving a plurality of first images for learning, each of the first images including a class label corresponding to one of a plurality of kinds, and (ii) generating kind identifiers based on the received first images, each of the kind identifiers individually identifying a kind of a respective one of the first images;
an identification fault counting step of (i) providing a plurality of second images for testing to the kind identifiers so that each of the kind identifiers individually identifies a kind of a respective one of the provided second images, each of the second images including one of a plurality of class labels, and (ii) counting, for a combination of an arbitrary number of kinds from among the plurality of kinds, a number of times than an incorrect determination is made with respect to the kinds belonging to the combination;
a grouping processing step of adding, for a group of the combination for which a result of the counting is equal to or greater than a predetermined threshold, a group label corresponding to the group, the group label being added to images among the first images for learning that include a class label corresponding to one of the arbitrary number of kinds belonging to the group;
a second learning step of (i) receiving the images among the first images for learning to which the group label has been added, (ii) generating a group identifier based on the received images among the first images for learning that identifies the group of the received images among the first images for learning, (iii) forming a first class identifier by combining the group identifier and a kind identifier that identifies a kind being excluded from the group, and (iv) generating an intra-group identifier that identifies an arbitrary number of kinds of images belonging to the group, to form a second class identifier; and
a step of generating an inter-class accumulating processor that (i) performs an identification judging processing according to an identification score value obtained by adding an identification score value of the first class identifier corresponding to the group, and a value in which an identification score value of the second class identifier is multiplied by a predetermined magnification, with respect to the group, and (ii) performs an identification judging processing according to the identification score value of the first class identifier with respect to the kind being excluded from the group.

8. A non-transitory computer-readable recording medium having a program stored thereon, the program being executable to control a computer to function as:
a first learner which (i) receives a plurality of first pieces of characteristic data for learning, each of the first pieces of characteristic data including a class label corresponding to one of a plurality of kinds, and (ii) generates kind identifiers based on the received first pieces of characteristic data, each of the kind identifiers individually identifying a kind of a respective one of the first pieces of characteristic data;
an identification fault counter which (i) provides a plurality of second pieces of characteristic data for testing to the kind identifiers so that each of the kind identifiers individually identifies a kind of a respective one of the provided second pieces of characteristic data, each of the second pieces of characteristic data including one of a plurality of class labels, and (ii) counts, for a combination of an arbitrary number of kinds from among the plurality of kinds, a number of times that an incorrect determination is made with respect to the kinds belonging to the combination;
a grouping processor that adds, for a group of the combination for which a result of the counting is equal to or greater than a predetermined threshold, a group label corresponding to the group, the group label being added to pieces of the characteristic data for learning that include a class label corresponding to one of the arbitrary number of kinds belonging to the group; and
a second learner that (i) receives the pieces of characteristic data for learning to which the group label has been added, (ii) generates a group identifier based on the received pieces of characteristic data that identifies the group of the received pieces of characteristic data, (iii)

forms a first class identifier by combining the group identifier and a kind identifier that identifies a kind being excluded from the group, and (iv) generates an intra-group identifier that identifies an arbitrary number of kinds of characteristic data belonging to the group, to form a second class identifier;

wherein the second learner further generates an inter-class accumulating processor that (i) performs an identification judging processing according to an identification score value obtained by adding an identification score value of the first class identifier corresponding to the group, and a value in which an identification score value of the second class identifier is multiplied by a predetermined magnification, with respect to the group, and (ii) performs an identification judging processing according to the identification score value of the first class identifier with respect to the kind being excluded from the group.

9. A non-transitory computer-readable recording medium having a program stored thereon, the program being executable to control a computer to function as:

a first learner that (i) receives a plurality of first images for learning, each of the first images including a class label corresponding to one of a plurality of kinds, and (ii) generates kind identifiers based on the received first images, each of the kind identifiers individually identifying a kind of a respective one of the first images;

an identification fault counter that (i) provides a plurality of second images for testing to the kind identifiers so that each of the kind identifiers individually identifies a kind of a respective one of the provided second images, each of the second images including one of a plurality of class labels, and (ii) counts, for a combination of an arbitrary number of kinds from among the plurality of kinds, a number of times that an incorrect determination is made with respect to the kinds belonging to the combination;

a grouping processor that adds, for a group of the combination for which a result of the counting is equal to or greater than a predetermined threshold, a group label corresponding to the group, the group label being added to images among the first images for learning that include a class label corresponding to one of the arbitrary number of kinds belonging to the group; and a second learner that (i) receives the images among the first images for learning to which the group label has been added, (ii) generates a group identifier based on the received images among the first images for learning that identifies the group of the received images among the first images for learning, (iii) forms a first class identifier by combining the group identifier and a kind identifier that identifies a kind being excluded from the group, and (iv) generates an intra-group identifier that identifies an arbitrary number of kinds of images belonging to the group, to form a second class identifier;

wherein the second learner further generates an inter-class accumulating processor that (i) performs an identification judging processing according to an identification score value obtained by adding an identification score value of the first class identifier corresponding to the group, and a value in which an identification score value of the second class identifier is multiplied by a predetermined magnification, with respect to the group, and (ii) performs an identification judging processing according to the identification score value of the first class identifier with respect to the kind being excluded from the group.

* * * * *